Figure 1:
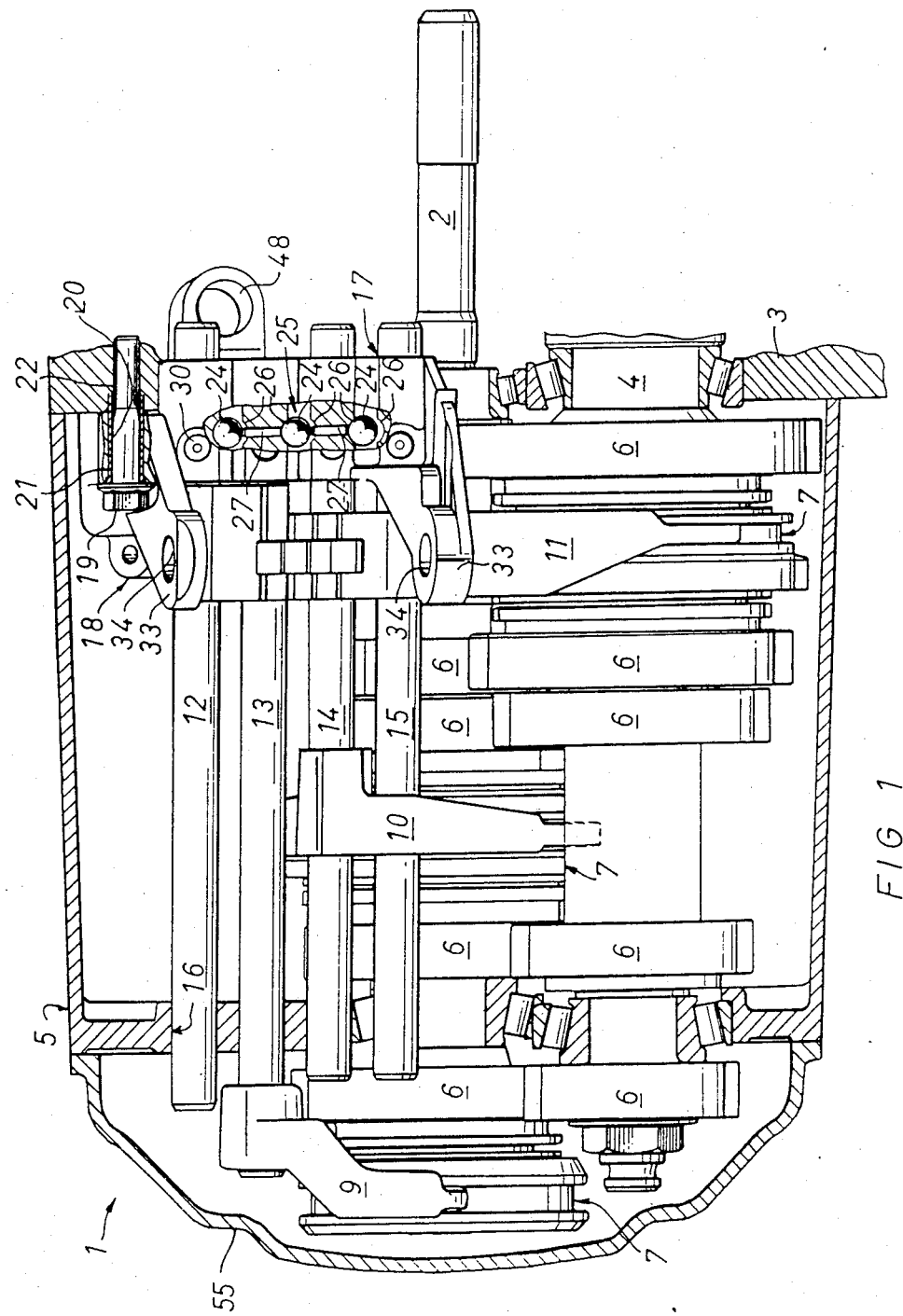

United States Patent [19]

Skog

[11] Patent Number: 4,614,129
[45] Date of Patent: Sep. 30, 1986

[54] ARRANGEMENT FOR MOUNTING GEAR SHIFT MEANS IN A GEARBOX

[75] Inventor: Lars H. Skog, Södertälje, Sweden

[73] Assignee: Saab-Scania Aktiebolag, Södertälje, Sweden

[21] Appl. No.: 682,303

[22] Filed: Dec. 17, 1984

[30] Foreign Application Priority Data

Dec. 20, 1983 [SE] Sweden ................. 8307044

[51] Int. Cl.$^4$ ................. G05G 5/10; G05G 9/12
[52] U.S. Cl. ................. 74/477; 74/473 R; 74/475
[58] Field of Search ................. 74/473 R, 475, 477

[56] References Cited

U.S. PATENT DOCUMENTS

| | | | |
|---|---|---|---|
| 1,485,278 | 2/1924 | Lancia . | |
| 2,654,268 | 10/1953 | Perkins | 74/477 X |
| 3,052,135 | 9/1962 | Hurst, Jr. et al. | 74/477 X |
| 3,347,108 | 10/1967 | Hinke | 74/477 X |
| 4,120,212 | 10/1978 | Philipsen | 74/477 X |
| 4,305,308 | 12/1981 | Ballendux | 74/477 X |

FOREIGN PATENT DOCUMENTS

| | | |
|---|---|---|
| 2177112 | 11/1973 | France . |
| 955771 | 4/1964 | United Kingdom . |
| 1481350 | 7/1977 | United Kingdom . |
| 2138518A | 10/1984 | United Kingdom . |

*Primary Examiner*—Allan D. Herrmann
*Attorney, Agent, or Firm*—Cushman, Darby & Cushman

[57] ABSTRACT

In an arrangement for mounting gear shift means in a gearbox, a number of selector shafts carry axially movable selector forks for operating a number of clutches for putting alternative gears in mesh while forming different gear ratios for the gearbox. An integrally implemented bearing bracket is removably attached to and enclosed in the gearbox housing and is formed with bearings for the selector shafts, so that these are at least partially carried by the bearing bracket. With the bearing bracket designed as a separate unit, the machining during manufacture and the configuration and manufacturing of the housing will be simplified, thereby reducing the risk of having to reject an entire housing due to incorrect manufacture.

7 Claims, 3 Drawing Figures

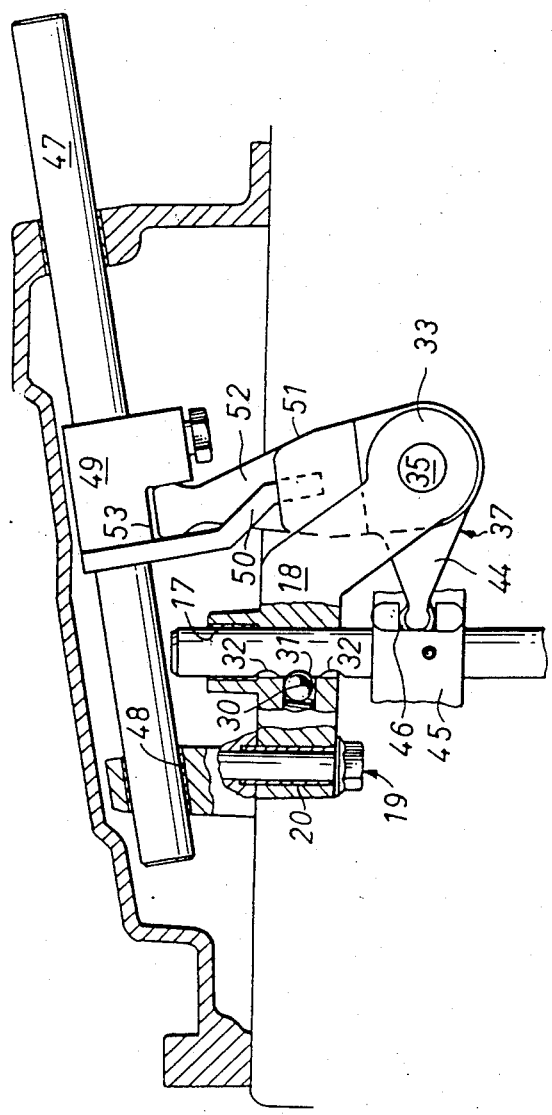

ARRANGEMENT FOR MOUNTING GEAR SHIFT MEANS IN A GEARBOX

The present invention relates to an arrangement for mounting gear shift means in a gearbox including a plurality of selector shafts that carry a corresponding plurality of selector forks, which are axially movable relative to a housing of the gearbox, for operating a plurality of clutches to put alternative gears in mesh for providing different gear ratios for the gearbox.

A housing for a gearbox is usually formed by a casting operation, after which bearing and mating surfaces etc. are machined. For bearing surfaces to have sufficient size and strength, it is generally required that the housing is cast with material thicknesses at the places in question. In known embodiments of gearbox housings, those places where there is material thickening create problems since they cause, inter alia, stress concentrations which reduce the strength. Since such a conventional housing requires a plurality of machining operations, the risk of incorrect machining will be comparatively large. The risk thus increases that the housing must be rejected, which usually means high costs and troublesome production problems.

The present invention has the object of avoiding or at least reducing the mentioned drawbacks, and thus also reduce risk of housing rejections. In accordance with the invention, this is solved by having an integrally implemented bearing bracket removably attached to, and enclosed in the housing and formed with bearings for the selector shafts so that these are at least partially carried by the bearing bracket.

By forming a bearing bracket in accordance with the invention for removable attachment in the housing, the casting and machining of the housing can be made simpler and thus also cheaper. The risk of rejections is reduced since the housing can be cast with fewer places where there is material thickening and also since the number of machinings on the housing is less than before.

The bearing bracket is manufactured as a separate unit, and possible incorrect machining of it results solely in rejection of the bearing bracket. Such a rejection is not as costly as the rejection of an entire housing.

The invention also affords other considerable advantages. Thus, to advantage, the parts which the bearing bracket is intended to carry can be assembled on it before it is fitted to the housing. Such sub-assembly results in that assembly can be made more ergonomically correct and more rapid than assembling a conventional gearbox. Corresponding advantages are obtained for service and repairs also, since the entire bearing bracket can be easily removed.

Further features distinguishing the invention are apparent from the following description of an embodiment exemplifying the invention. The description is made with reference the accompanying drawings, of which FIG. 1 is an axial cross section of a gearbox, FIG. 2 is a radial cross section of an inventive bearing bracket mounted in the gearbox, and FIG. 3 is an axial cross section of a gear shifting arrangement included in the gearbox.

Figure 2:
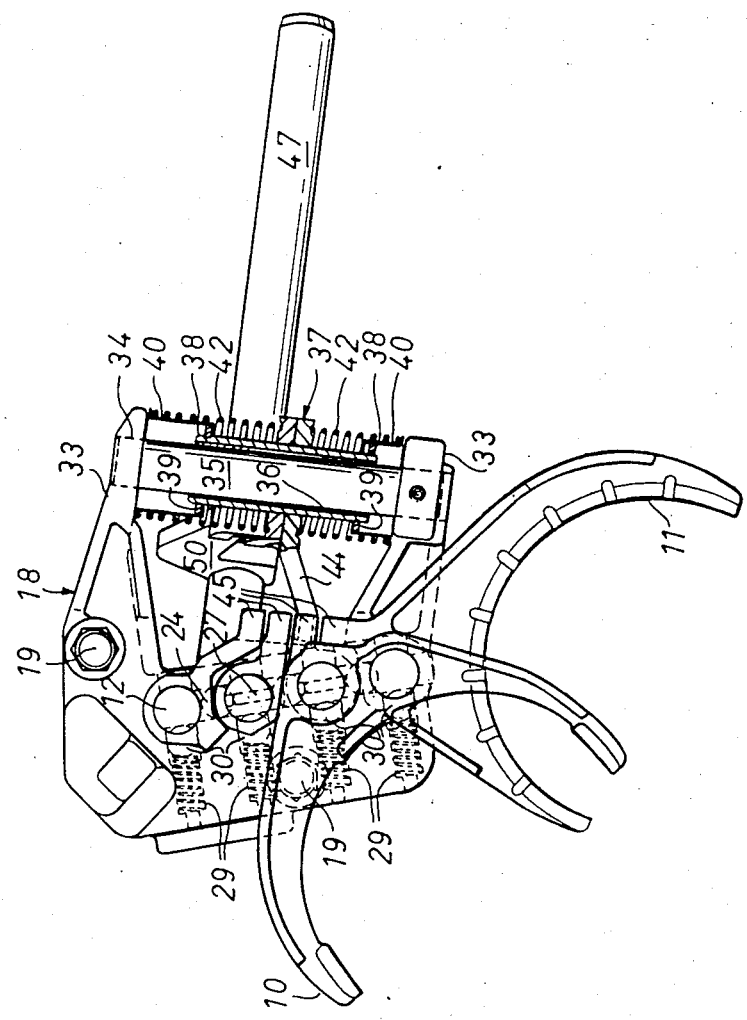

A gearbox 1 for a vehicle, more specifically for a car, is illustrated in FIG. 1 and is outwardly defined by a housing 5, a cover 55 joined to one end wall of the housing 5, and a clutch cover 3 joined to the other end wall of the housing 5.

The gearbox 1 includes an input shaft 2 which is connected to an engine (not shown), and an output shaft 4 which is connected to the driving wheels (not shown) of the car. The shafts 2,4 are journalled in the housing 5 and the clutch cover 3, and carry a plurality of mutually coacting gears 6 which, by being meshed alternatively, conventionally form different gear ratios for the gearbox 1. Such meshing is afforded conventionally with the aid of a plurality of synchronizing clutches 7, each of which is operated by axial movement of a selector fork engaging with the respective synchronizing clutch 7. The gearbox 1 in question is provided with four synchronizing clutches 7, each operated by a selector fork, of which three only, namely 9, 10 and 11, are illustrated in FIG. 1. Each selector fork is rigidly connected to an axially movable selector shaft 12,13,14,15, respectively.

A selector shaft 12 carries a selector fork (not shown) for engaging a reverse gear, a selector shaft 13 carries a selector fork 9 for engaging a fifth gear, a selector shaft 14 carries a selector fork 10 for engaging a third or a fourth gear, and a selector shaft 15 carries a selector fork 11 for engaging a first or a second gear. Since such synchronizing clutches 7 are well-known per se, both with respect to constructional embodiment and operation, and since they are not of essential importance for understanding the present invention, they are not described further.

Each selector shaft 12-15 is at one end mounted in a bearing 16, one for each selector shaft, arranged in the housing 5, and is at its other end mounted in a bearing 17, one for each selector shaft, disposed in an inventive bearing bracket 18. This is an assemblable unit which is removably fastened to the clutch cover 3 of the housing 5 by a plurality of bolts 19. The bearing bracket 18 is located relative to the housing 5 by locating sleeves 20 pressed into locating holes 21,22 in the bearing bracket 18 and clutch cover 3, respectively. The locating holes 22 in the clutch oover 3 are partially threaded, so that the bolts 19 can be screwed into the same holes, which means that the locating holes 22 are also used for fastening.

Further to the bearings 17, the bearing bracket 18 also includes a double position detent including three detent balls 24 accommodated in bores 25 between the four selector shafts 12-15. The detent balls 24 engage in peripheral depressions 26 disposed on the respective selector shaft 12-15 and lock the selector shafts 12-15 against axial movement. The balls 24 can act on each other via two pins 27 which are radially displaceably mounted in through-holes in the two middle selector shafts 13,14. A clearance is arranged between the balls 24 and the peripheral depressions 26 on the selector shafts 12-15 which is sufficiently large to allow one of the balls 24 to be displaced from its depression 26 so that the selector shaft 12-15 in question can be moved axially. In FIG. 1 the balls 24 are illustrated in a position where the lower selector shaft 15 is axially movable, while the remaining selector shafts 12-14 are axially locked. The double position detent thus prevents more than one gear being engaged at the same time.

As is apparent from FIG. 2, the bearing bracket 18 is also formed with four bores 29, each accommodating a spring-loaded detent ball 30. These balls 30 engage in complemental depressions 31 on the respective selector shafts 12-15 and are intended to retain the selector shafts axially in predetermined positions. FIG. 3 illustrates how one of the balls 30 coacts with one of the shafts 12-15. Each shaft 12-15 has a depression 31 to retain it in a neutral gear position and a depression 32 for retaining it in an engaged gear position. The two lower selector shafts 14,15 in FIG. 1 each have two different engaged positions and are thus made with a depression 32 on either side of the depression 31.

The bearing bracket 18 is further formed with two arms 33, each formed with a seat 34 for a journalling pin 35.

More clearly to illustrate other parts in the gearbox 1, the pin 35 is not illustrated in FIG. 1 but can be seen in FIGS. 2 and 3. The pin 35 carries a sleeve 36 which is both axially and pivotably movable, and which is rigidly connected to a gear shifter 37. The latter is adapted to cause axial movement of the respective selector shaft 12-15 for engaging and disengaging different gears. The sleeve 36 is substantially cylindrically shaped and at each end it is formed with an external groove for a circlip 39, each engaging against a spring guide 40 arranged at either end. The circlips 39 allow the sleeve 36 to move freely through one spring guide 40 when moved in one axial direction, while the other spring guide 40 is caused to accompany the axial movement.

The spring guides 40 are formed at their outer ends with annular surfaces against which engage the outer ends of two helical springs 42. The other ends of the springs 42 engage on seating surfaces on the gear shifter 37. The springs 42 are prestressed compression springs and are adapted for centering the gear shifter 37 and maintaining it in a predetermined axial position on the pin 35 when the gears in the gearbox are caused to assume neutral position. For axial movement of the gear shifter 37 in either direction, one of the springs 42 will be compressed to oppose the movement, while the spring guide 40 belonging to the other spring 42 by means of the sleeve 36 and the circlip 39 moves in accompaniment. The other spring 42 is thus only moved axially and engages with unaltered force against the gear shifter 37.

The gear shifter 37 is formed with a lever 44, adapted to alternatively engage in a dog 45 attached to each selector shaft 12-15, as illustrated in FIGS. 2 and 3. To this end, each dog 45 is formed with a groove 46 in which the outer end of the lever 44 can engage. In neutral, the grooves 46 of the dogs 45 are located in the same axial plane. By axial movement of the gear shifter 37 on the pin 35, the lever 44 can be caused to engage in a selected dog 45. By rotating the shifter 37, the selected dog 45 is given axial movement to engage a gear.

The gear shifter 37 is operated manually by a gear change lever (not shown) and a link transmission mechanism. Such a mechanism includes a gear changing rod 47 mounted for axial and rotational movement in the gearbox. A bearing 48 is arranged on the bearing bracket 18 for one end of the rod 47, its other end being mounted in the housing 5. The rod 47 is not illustrated in FIG. 1 but may be seen in FIGS. 2 and 3. A dog 49, rigidly connected to the rod 47, is formed with a lever 50, the outer end of which engages in a transverse slot 51 on the gear shifter 37. The latter is formed with a second lever 52 engaging with its outer end in a transverse cut-out 53 on the dog 49 of the rod 47.

The function of such a described arrangement for the gear shifting means of the gearbox 1 is as follows. Turning the rod 47 results in an axial movement of the gear shifter 37, thus enabling the lever 44 of the gear shifter 37 to be set in a position for a desired dog 45 on one of the selector shafts 12-15. Axial movement of the rod 47 results in turning the gear shifter 37. The dog 45 on the appropriate selector shaft 12-15 can then be axially moved to engage a gear.

The axial springs 42 on the pin 35 are dimensioned such that when the gearbox 1 is in neutral, the gear shifter 37 will assume a position with the dog 45 which is rigidly connected to the shaft 14 for the third and fourth gear. The consequence here is that the gear change lever assumes a corresponding predetermined position which facilitates engaging a gear. In manufacturing an inventively formed gearbox 1, the housing 5 can be suitably produced by casting. The housing 5 can then be formed with a relatively simple configuration, and places where the material is thickened can be avoided to a great extent. Machining the housing 5 will also be easy to carry out since only a few machining operations are required.

The bearing bracket 18 is a separate unit, in accordance with the invention, which substantially facilitates machining. The bearing bracket 18 can also be used for subassembly of parts to a large extent, before it is fitted to the housing.

The invention is not confined to the exemplified embodiment, but can be modified in other embodiments within the scope of the following claims. Thus, the selector shafts may be rigidly mounted on the bearing bracket, while the selectors are axially movably mounted on the selector shafts.

What I claim is:

1. In a gear box: a housing having an axis and axis end walls; within the housing a plurality of axially movable selector shafts that carry a corresponding plurality of selector forks, which forks are axially movable relative to the housing for providing different gear ratios for the gearbox; an integrally implemented bearing bracket enclosed in the housing and removably attached to the inner surface of one of said axial end walls of the housing by bolts fitted in locating holes in the bearing bracket and in holes in said one axial end wall, each of the locating holes in the bearing bracket being provided with a locating sleeve which, for positioning the bearing bracket relative to the housing, also fits into the corresponding hole in said one axial end wall, said bracket being formed with bearings for the selector shafts so that the shafts are at least partially carried by the bearing bracket.

2. Apparatus as in claim 1, wherein each selector shaft is mounted axially movable in the bearing bracket and each selector fork is attached to one selector shaft.

3. Apparatus as in claim 2, wherein the bearing bracket has bores accomodating detent means arranged between the selector shafts, said detent means engaging in depressions on the selector shafts for preventing axial movement of more than one selector shaft at the same time.

4. Apparatus as in claim 3, wherein the detent means are balls.

5. Apparatus as in claim 4, wherein the bearing bracket also has bores for detent means engaging in depressions on the selector shafts for retaining the selector shafts in a given axial position.

6. Apparatus as in claim 5, wherein the detent means are spring-loaded balls.

7. Apparatus as in claim 6, wherein the bearing bracket has seats for a pin that carries a gear shift means movable axially and rotationally, which conventionally engages and disengages different gears in the gearbox.

* * * * *